(12) United States Patent
Oskarsson et al.

(10) Patent No.: US 10,156,000 B2
(45) Date of Patent: Dec. 18, 2018

(54) STRIP MATERIAL WITH EXCELLENT CORROSION RESISTANCE AFTER BRAZING

(71) Applicant: Gränges Sweden AB, Finspång (SE)

(72) Inventors: Anders Oskarsson, Finspång (SE);
Scott Haller, Richmond, VA (US);
Bevis Hutchinson, Bromma (SE)

(73) Assignee: Gränges Sweden AB, Finspång (SE)

( * ) Notice: Subject to any disclaimer, the term of this patent is extended or adjusted under 35 U.S.C. 154(b) by 542 days.

(21) Appl. No.: 14/416,383

(22) PCT Filed: Jul. 26, 2013

(86) PCT No.: PCT/SE2013/050932
§ 371 (c)(1),
(2) Date: Jan. 22, 2015

(87) PCT Pub. No.: WO2014/017976
PCT Pub. Date: Jan. 30, 2014

(65) Prior Publication Data
US 2015/0203934 A1    Jul. 23, 2015

(30) Foreign Application Priority Data

Jul. 27, 2012  (SE) ...................................... 1250901

(51) Int. Cl.
*B23K 1/19*     (2006.01)
*C21D 9/50*     (2006.01)
(Continued)

(52) U.S. Cl.
CPC .............. *C21D 9/50* (2013.01); *B23K 1/0012* (2013.01); *B23K 1/19* (2013.01); *B23K 35/0233* (2013.01);
(Continued)

(58) Field of Classification Search
None
See application file for complete search history.

(56) References Cited

U.S. PATENT DOCUMENTS

| 4,146,164 A | 3/1979 | Anderson et al. |
| 5,011,547 A | 4/1991 | Fujimoto et al. |

(Continued)

FOREIGN PATENT DOCUMENTS

| CN | 101760682 | 6/2010 |
| CN | 102083620 | 6/2011 |

(Continued)

OTHER PUBLICATIONS

International Search Report and written opinion for PCT/SE2013/050932 dated Jan. 2, 2014.

(Continued)

*Primary Examiner* — Daniel J. Schleis
(74) *Attorney, Agent, or Firm* — Morgan, Lewis & Bockius LLP (57) ABSTRACT

A corrosion resistant strip is disclosed. The strip comprises a core, and an interlayer adapted to be located between the core and an optional Al—Si based clad. The interlayer has a composition essentially consisting of (in percentages by weight): Si≤0.9%, Fe≤0.7%, Cu≤0.5%, Mn 0.5-1.8%, Mg≤0.7%, Zn≤4.0%, Ni≤1.5%, elements selected from group IVb, Vb, and/or VIb of the periodic table ≤0.3% each and ≤0.5% in total ≤0.05 wt % each and ≤0.15% in total, of unavoidable impurity elements, balance Al. The core is more noble than the interlayer after brazing. The interlayer exhibits a volume fraction of a texture component of at least 30%.

34 Claims, 5 Drawing Sheets

(51) Int. Cl.
| | |
|---|---|
| B23K 35/02 | (2006.01) |
| B32B 15/01 | (2006.01) |
| C22C 21/00 | (2006.01) |
| C22C 21/14 | (2006.01) |
| C22C 21/16 | (2006.01) |
| C22F 1/04 | (2006.01) |
| F28F 21/08 | (2006.01) |
| B23K 1/00 | (2006.01) |
| B23K 35/28 | (2006.01) |
| C21D 8/00 | (2006.01) |
| C22C 21/02 | (2006.01) |
| F28F 19/06 | (2006.01) |

(52) U.S. Cl.
CPC ........ *B23K 35/0238* (2013.01); *B23K 35/288* (2013.01); *B32B 15/016* (2013.01); *C21D 8/00* (2013.01); *C22C 21/00* (2013.01); *C22C 21/02* (2013.01); *C22C 21/14* (2013.01); *C22C 21/16* (2013.01); *C22F 1/04* (2013.01); *F28F 19/06* (2013.01); *F28F 21/084* (2013.01); *F28F 21/089* (2013.01); *Y10T 428/12764* (2015.01)

(56) References Cited

U.S. PATENT DOCUMENTS

| | | | |
|---|---|---|---|
| 5,041,343 | A | 8/1991 | Fortin et al. |
| 6,019,939 | A | 2/2000 | Gray et al. |
| 6,306,342 | B2 | 10/2001 | Koch et al. |
| 6,555,251 | B2* | 4/2003 | Kilmer ............... B23K 35/0238 138/142 |
| 6,743,396 | B2 | 6/2004 | Wagner et al. |
| 6,764,558 | B2 | 7/2004 | Kucza et al. |
| 7,255,932 | B1* | 8/2007 | Kilmer ................ B23K 35/002 165/905 |
| 7,514,155 | B2 | 4/2009 | Benedictus et al. |
| 7,608,345 | B2 | 10/2009 | Bürger et al. |
| 7,691,489 | B2 | 4/2010 | Ekström et al. |
| 8,574,723 | B2 | 11/2013 | Ekström |
| 8,871,356 | B2 | 10/2014 | Ogilvy et al. |
| 9,096,916 | B2 | 8/2015 | Norgren et al. |
| 2002/0142185 | A1 | 10/2002 | Kilmer |
| 2007/0166565 | A1 | 7/2007 | Fukumoto et al. |
| 2008/0118393 | A1 | 5/2008 | Oskarsson et al. |
| 2010/0012229 | A1 | 1/2010 | Oskarsson et al. |
| 2010/0159272 | A1 | 6/2010 | Marois et al. |
| 2010/0291400 | A1 | 11/2010 | Ahl et al. |
| 2011/0042053 | A1 | 2/2011 | Ekström |
| 2012/0070681 | A1 | 3/2012 | Norgren et al. |
| 2012/0199634 | A1 | 8/2012 | Ekström et al. |

FOREIGN PATENT DOCUMENTS

| | | |
|---|---|---|
| CN | 102422118 | 4/2012 |
| EA | 016458 B1 | 5/2012 |
| EP | 0 823 305 | 2/1998 |
| EP | 1430988 A1 | 6/2004 |
| EP | 1 918 394 | 5/2008 |
| EP | 2 065 180 A1 | 6/2009 |
| EP | 22 53 726 | 11/2010 |
| EP | 2 877 317 | 12/2015 |
| GB | 2 353 750 A | 3/2001 |
| JP | H08-120380 | 5/1996 |
| JP | H10-158769 A | 6/1998 |
| JP | 2005-523164 A | 8/2005 |
| JP | 3788737 | 6/2006 |
| JP | 2009-167509 | 7/2009 |
| JP | 2009-167509 A | 7/2009 |
| JP | 2009167509 * | 7/2009 |
| WO | 03089237 A1 | 10/2003 |
| WO | WO 03/089237 | 10/2003 |
| WO | WO 2005/118899 | 12/2005 |
| WO | WO 2006/043137 | 4/2006 |
| WO | WO 2006/044500 | 4/2006 |
| WO | WO 2007/042206 | 4/2007 |
| WO | 2009/037263 A1 | 3/2009 |
| WO | 2010132018 A1 | 11/2010 |
| WO | WO 2010/132018 | 11/2010 |
| WO | WO 2011/046499 | 4/2011 |
| WO | WO 2013/180630 | 12/2013 |

OTHER PUBLICATIONS

Notice of Opposition to a European Patent, (Aleris Rolled Products Germany GmbH), European Application No. 13770720.4 dated Aug. 31, 2016.
Notice of Opposition to a European Patent, (C-Tec Constellium Technology Center), European Application No. 13770720.4 dated Sep. 7, 2016.
Notice of Opposition to a European Patent, (Alcoa, Inc.), European Application No. 13770720.4 dated Sep. 9, 2016.
Notice of Opposition to a European Patent, (Hydro Aluminium Rolled Products GmbH), European Application No. 13770720.4 dated Sep. 9, 2016.
Hydro Aluminum Rolled Products—Material Data Sheet for alloy HA 3905-G and (Jul. 2011), 2 pages.
K. Sjølstad et al., "Texture Evolution of an AA3xxx Alloy after Different Homogenisation Treatments", Materials Science Forum, vols. 396-402 (2002) pp. 463-468.
J. R. Davis, Ed., Aluminum and Aluminum Alloys in ASM Specialty Handbook, ASM International (1993), pp. 244-249.
J. R. Davis, Ed., Aluminum and Aluminum Alloys in ASM Specialty Handbook, ASM International (1994), pp. 580-581.
C. Kammer, Ed., Aluminium Handbook—vol. 1: Fundamentals and Materials, Aluminium-Zentrale e.V (1999), pp. 245-249.
A. Wittebrood, Microstructural Changes in Brazing Sheet due to Solid-Liquid Interaction, PhD Thesis, Delft University, Oct. 2009, pp. 115-118.
E. Olson, Particle Shape Factors and Their Use in Image Analysis—Part 1 Theory, Journal of GXP Compliance, Summer 2011, vol. 15, No. 3, pp. 85-96.
F.J. Humphreys et al., Recrystallization and Related Annealing Phenomena, Elsevier Science Ltd (1995), p. 332.
J.S. Yoon et al., Fabrication and brazeability of a three-layer 4343/3003/4343 aluminum clad sheet by rolling, Journal Materials Processing Technology, 111 (2001), pp. 85-89.
Affidavit of Me Danielou (4 pages) (submitted with C-Tec Opposition dated Sep. 7, 2016.
ASM Specialty Handbook, Aluminum and Aluminum Alloys, J.R. Davis editor, ASM International, pp. 579-580 (1993).
First Office Action (with English translation) for Chinese Application No. 201380039719.X dated Mar. 3, 2016.
Office Action issued in corresponding Russian Patent Application No. 2015106733/02(010868) dated Jun. 2, 2017.
Itoh et al., "Erosion in Aluminium Brazing", Sumitomo Light Metal Technical Journal, Japan, Apr. 1989, vol. 30, No. 2, pp. 103-113. (with partial translation).
Office Action dated May 8, 2017 issued in corresponding Japanese Patent Application No. 2015-524226.
Jis Handbook 3, Non-Ferrous, "Aluminium, magnesium and their alloys—Temper designation", Japanese Standards Association, Nov. 9, 2007, first edition, first print, pp. 1201-1209.
Office Action issued in corresponding Japanese Patent Application No. 2015-524226 dated Apr. 23, 2018.
Notice of Opposition to a European Patent, (Alcoa Inc.), European Patent Application No. 13770720.4 dated Aug. 23, 2018.
Kammer, Aluminium Taschenbuch, Aluminium-Verlag, (2002), pp. 676-677.
Notice of Opposition to a European Patent, (Hydro Aluminium Rolled Products GmbH), European Patent Application No. 2877317 dated Aug. 23, 2018.
Li, et al., "A TEM Study on α-Al(Mn,Fe)Si Dispersoids Precipitated in AA3003 Alloy", Proceedings of the 12th International Conference on Aluminium Alloys, Sep. 5-9, 2010, pp. 498-503.

(56) References Cited

OTHER PUBLICATIONS

Notice of Opposition to a European Patent, (C-TEC Constellium Technology Center), European Patent Application No. 13770720.4 dated Aug. 20, 2018.
Hatch, Ed., Aluminum Properties and Physical Metallurgy, American Society for Metals, 1984, pp. 64-65.
Deneuville, "Mise en forme de l'aluminium—Laminage", Techniques De L'Ingenieur, M3140 V1, Jun. 10, 2010.
Affidavit of Mme Daniélou (4 pages) submitted with C-TEC Constellium Technology Center Opposition dated Aug. 20, 2018.
Notice of Opposition to a European Patent, (Aleris Rolled Products Germany GmbH), European Patent Application No. 13770720.4 dated Aug. 22, 2018.

* cited by examiner

STRIP MATERIAL WITH EXCELLENT CORROSION RESISTANCE AFTER BRAZING

RELATED APPLICATIONS

The present application is a U.S. National Phase Application of International Application No. PCT/SE2013/050932, filed 26 Jul. 2013, which claims priority to Swedish Application No. 1250901-4, filed 27 Jul. 2012.

TECHNICAL FIELD

The present disclosure relates in general to a strip with excellent corrosion resistance after brazing and intended for producing components by brazing, such as components made of tubes and/or plates especially used in heat exchangers. The tubes or plates can be delivered with or without a braze cladding depending on the application.

The present disclosure also relates to a method of producing such a strip.

BACKGROUND

Down gauging of sheet thicknesses and/or new applications in severe corrosion environments for brazed aluminium heat exchangers requires more sophisticated materials to be used in these products with improved corrosion performance in the final brazed product. In common for these products is that the joints are created by a filler metal that has been applied on one or several sides of the different components that build up the unit prior to brazing. The most common configuration is to use a rolled strip with a non melting core and a cladding consisting of an Al—Si alloy. This cladding normally contains about 4-13% silicon that melts during brazing at about 600° C. The joints form by capillary flow of the filler metal to the desired joint sites and solidify to form a solid metallic connection between individual components.

Brazed heat exchangers consist of different parts like tubes, fins, plates etc. brazed together. Different alloys are traditionally used for tubes, plates etc. and these components are often protected from corrosion by electrochemically sacrificial fins. In some applications and heat exchanger positions this is not enough but the tubes/plates need a very good corrosion performance on their own. Different designs for brazed heat exchangers can use different solutions for tubes, fins etc. and the braze clad can be applied on either ones. Often the braze clad is applied on tube and plate materials.

The reason for the use of different alloys in different types of components is that in brazed exchangers it is normally necessary to chose different alloys in the different fin, tube, and plate components to avoid corrosion to perforation of tubes and plates by sacrificing the fins. The use of different alloys is often done by alloying the fins with Zn to reduce their corrosion potential to an adequate level compared to other parts of e.g. a brazed heat exchanger. In a consequence to this, materials used for tubes and plates normally have additions of Mn and Cu with the aim to increase their corrosion potential.

A further challenge today is to manufacture light-weight components for the automotive market. A lot of research is therefore directed to the ability to reduce the weight of heat exchangers by using thinner strip materials without sacrificing other product and manufacturing properties. To be able to do this it is necessary to create new materials with higher post braze strength compared to the materials conventionally used, but still with adequate corrosion properties. For tubes and plates this means that they should normally be sacrificially protected by other parts of the heat exchanger by having a higher corrosion potential than the other parts. Achieving a higher post-braze strength is quite complicated without jeopardising the corrosion resistance and the resistance to liquid core penetration during brazing. Liquid core penetration significantly reduces the corrosion resistance in brazed products. Only when these requirements are met consistently by the new materials, this will allow the use of thinner tubes with a high post brazed strength, thereby reducing the weight compared to the products used today.

So called Long Life alloys have been developed giving improved corrosion performance by creating a sacrificial surface layer after brazing by creating a lower corrosion potential in the surface than in the centre of the core. These alloys are primarily aimed for tube and plate applications where the corrosion property demand is very large. The lower corrosion potential on the surface is due to the existence of more manganese and copper in solid solution in the core centre than in the core surface. This is due to diffusion of especially silicon and copper between the core and the braze clad in combination with core composition and prior processing. A sacrificial surface can also be created by alloying a clad layer with zinc that diffuses towards the core centre during brazing. A higher zinc level at the surface after brazing will be sacrificial compared to the core centre. This principle is used for both water side corrosion protection by a non melting cladding and for melting braze claddings.

Generally, strip materials can be delivered in different tempers prior to forming. This can lead to formability problems if delivered in the deformed conditions of primarily H1X (e.g. H14 or H16) but to a lesser extent also H2X (e.g. H24 or H26). If delivered in O temper and deformed prior to brazing, problems can arise with so called liquid film migration (LFM) during brazing giving poor brazing performance and very poor post braze corrosion performance. Liquid core penetration during brazing will deteriorate the brazing performance and post braze performance, i e corrosion performance. These problems become more severe the thinner the final gauge used in the final product. Especially the very strong demand for very good post braze corrosion performance is difficult to meet.

Multi layer concepts are available where either the core must be protected from the braze clad during brazing and/or the post braze corrosion protection must be improved.

In a previous method known disclosed in U.S. Pat. No. 6,555,251 a four-layer material is produced where the interlayer has a higher content of Si than the core material. This material does however not possess sufficient corrosion resistance and resistance to braze penetration.

Another method for producing strip or sheet for heat exchangers is known from U.S. Pat. No. 6,743,396 in which an alloy is described containing ≤0.5% Fe, 1.0-1.8% Mn, 0.3-1.2% Si, ≤0.3% Mg, ≤0.1% Cu, ≤0.1% Zn, ≤0.1% Ti, 0.05-0.4% Cr+Zr, ≤0.15% Sn the remainder aluminium and unavoidable impurities, the ratio % Sn/% Si being ≥0.03. Ingots are cast, which are subsequently preheated to an initial rolling temperature less than 520° C. for at most 12 hours and hot rolled to a thickness between 2 and 10 mm with a final hot rolling temperature not less than 250° C. A final annealing is given at a temperature of at least 300° C., which means that the material is fully or substantially recrystallised. In this document nothing is said about core penetration during brazing and the resistance to corrosion after brazing is not mentioned. The high final annealing temperature would normally give a fully or partially recrystallised structure according to the patent description by the inventors. Nothing is said about the use of this material as an interlayer.

It has been shown in the practical testing of the material produced according to the previously known methods that the properties of the aluminium strip are insufficient for certain applications when the manufacturers need to down gauge. This particularly applies for the high post-braze strength combined with the high corrosion resistance and low susceptibility for liquid core penetration of the material.

SUMMARY OF THE INVENTION

The object of the present invention is a strip material intended for use in the production of brazed components or products, said strip material having an excellent corrosion resistance after brazing. The strip is primarily intended for clad tube and clad plate.

The object is achieved by the corrosion resistant strip as defined in independent claim 1 and the method of producing a corrosion resistant strip as defined in independent claim 15. Embodiments are defined by the dependent claims.

The present invention solves the problems of prior art by having superior post-braze corrosion properties and high strength with excellent brazing performance. At the same time the strip according to the invention may be highly formable. The strip according to the invention is extremely resistant to all types of liquid core penetration during brazing for different forming and brazing cycles. The reason is the controlled features of the interlayer as defined by the invention.

The strip comprises a core. Said core is clad on one or optionally both sides with an intermediate layer hereinafter denominated interlayer. The interlayer is preferably clad with a braze alloy or any other type of Al—Si based clad. Alternatively, the interlayer is not clad with a braze.

The corrosion resistant strip according to the present invention comprises a core of an aluminium based alloy, and an interlayer adapted to be located between the core and an optional Al—Si based clad. The interlayer has a composition essentially consisting of (in percentages per weight):

Si≤0.9%, suitably ≤0.7%, preferably 0.1-0.55%, more preferably 0.15-0.40%
Fe≤0.7%, preferably ≤0.5%, more preferably ≤0.3%
Cu≤0.5%, preferably ≤0.2%, more preferably ≤0.1%, most preferably ≤0.05%
Mn 0.5-1.8%, preferably 0.7-1.7%, more preferably 0.9-1.6%
Mg≤0.7%, preferably ≤0.3%, more preferably ≤0.15%, most preferably ≤0.05%
Zn≤4.0%, preferably ≤1.0%, more preferably ≤0.5%, most preferably ≤0.1%
Ni≤1.5% preferably ≤1.0%, more preferably ≤0.5%
elements selected from group IVb, Vb, and/or VIb of the periodic table ≤0.3% each and ≤0.5% in total
≤0.05 wt % each and ≤0.15% in total, of unavoidable impurity elements, balance Al;

The core is more noble than the interlayer after brazing which is achieved by properly selecting the composition of the core and the interlayer, respectively. Furthermore, the interlayer exhibits a volume fraction of a texture component of at least 30%, more preferably at least 50%, even more preferably at least 70%, most preferably at least 85%. According to one embodiment, the texture component is one of the group consisting of the P-texture {110}<111>, the cube {001}<100>, rotated cube {001}<110> or {001}<310> and the Goss texture {011}<100>, preferably the P-texture {110}<111>.

The fact that the interlayer has the specific texture component results in grain boundaries which are of a type which is relatively resistant to melt penetration, thus resulting in a strip which has an excellent resistance to liquid core penetration during brazing.

The strip according to the present invention may be produced by a method comprising providing a core ingot of an aluminium based alloy, attaching an interlayer to said core ingot, optionally attaching an Al—Si clad to the interlayer, the interlayer having a composition essentially consisting of in percentages per weight:

Si≤0.9%, suitably ≤0.7%, preferably 0.1-0.55%, more preferably 0.15-0.40%
Fe≤0.7%, preferably ≤0.5%, more preferably ≤0.3%
Cu≤0.5%, preferably ≤0.2%, more preferably ≤0.1%, most preferably ≤0.05%
Mn 0.5-1.8%, preferably 0.7-1.7%, preferably 0.9-1.6%
Mg≤0.7%, preferably ≤0.3%, more preferably ≤0.15%, most preferably ≤0.05%
Zn≤4.0%, preferably ≤1.0%, more preferably ≤0.5%, most preferably ≤0.1%
Ni≤1.5% preferably ≤1.0%, more preferably ≤0.5%
elements selected from group IVb, Vb, and/or VIb of the periodic table ≤0.3% each and ≤0.5% in total
≤0.05 wt % each and ≤0.15% in total, of unavoidable impurity elements, balance Al;

and wherein the core, post brazing, is more noble than the interlayer, optionally subjecting the core ingot with the attached interlayer to a preheating heat treatment, hot rolling to obtain a strip having a core and an interlayer, cold rolling the obtained strip such that the interlayer is reduced at least 90% in height, preferably at least 95%, more preferably at least 97.5%, most preferably at least 99% after the last heat treatment causing recrystallisation of the interlayer, heat treating the cold rolled strip to the delivery temper with the purpose to soften the material by a tempering without any recrystallisation of the interlayer.

The interlayer may for example be provided as an interlayer ingot and attached to the core ingot, alternatively cast directly onto the core ingot.

It has been found that by a very accurate control of the net driving force for recrystallisation of the interlayer material during brazing, an exceptionally low susceptibility for liquid core penetration during brazing is obtained. The net driving force for recrystallisation is the driving force created by stored deformation minus the retarding pressure given by the number density of particles. The strip material according to the present invention obtains the accurate net driving force for recrystallisation of the material during brazing by the combination of the compositions as well as the accurate cold deformation of the interlayer without recrystallisation prior to brazing. A large degree of accuracy is also necessary in the casting process and the heat treatments to achieve repeatable size and number density of particles that supplies the controlled retarding pressure for recrystallisation.

According to one embodiment of the invention, the core has a composition essentially consisting of (in percentages per weight):

Si≤1.0%, preferably ≤0.5%, more preferably ≤0.3%, most preferably ≤0.15%
Fe≤0.7%, preferably ≤0.5%, more preferably ≤0.3%
Cu≤1.0%, preferably 0.1-1.0%, more preferably 0.3-0.9%, most preferably 0.3-0.7%

Mn 0.5-1.8%, preferably 0.7-1.7%, more preferably 0.9-1.6%

Mg≤0.7%, preferably ≤0.5%, more preferably ≤0.3%

Zn≤0.5%, preferably ≤0.3%, more preferably ≤0.1%, most preferably ≤0.05%

Ni≤1.5% preferably ≤1.0%, more preferably ≤0.5% elements selected from group IVb, Vb, and/or VIb of the periodic table ≤0.3% each and ≤0.5% in total ≤0.05 wt % each and ≤0.15% in total, of unavoidable impurity elements, balance Al.

According to a further embodiment, the average grain size of the interlayer after brazing is controlled to at least 100 μm, preferably at least 150 μm, more preferably at least 250 μm, even more preferably at least 300 μm, most preferably at least 400 μm.

According to yet a further embodiment, the interlayer, in the as delivery condition, comprises Mn-rich particles in an amount of at least a dispersoid particle density in the range $1*10^6$ to $20*10^6$, preferably between $1.3*10^6$ and $10*10^6$, most preferably between $1.4*10^6$ and $7*10^6$ particles/mm$^2$ of particles having a diameter in the range of 30-400 nm.

According to yet an embodiment, the properties of the strip may additionally be improved by performing cold rolling, tension levelling and other similar processes to impart a level of cold work, after the last heat treatment (with the purpose of softening the material by tempering) where the core does not recrystallize, in the range of 0.05-20% cold work, preferably 0.05-15%, more preferably 0.05-10%, most preferably 0.05-5%. In this way, the grain size of the interlayer can be additionally tailored. The material obtained can have a high strength after brazing in a unique combination with good brazing performance and an exceptionally high post braze corrosion resistance and a low susceptibility for liquid core penetration during brazing. At the same time a good formability in the delivery temper may be achieved. The intermediate layer has a corrosion potential that may be adjusted to the core layer of the material, so that the core is protected sacrificially.

The invention also provides the use of the corrosion resistant strip in the manufacture of a brazed product as well as a brazed heat exchanger comprising the corrosion resistant strip.

The strip may be used to make products by any brazing method, in particular the controlled atmosphere brazing method (CAB). However, the use of braze alloys that contain suitable amounts of magnesium may allow the use of sheet according to the present invention also in vacuum brazing.

DETAILED DESCRIPTION

The present invention will be described in more detail below with reference to certain preferred embodiments. It should however be noted that the invention is not limited to the specific embodiments disclosed but may be varied within scope of the appended claims.

The strip according to the present invention has an excellent corrosion resistance after brazing in the form of good pitting resistance and very low susceptibility to liquid core penetration during brazing. The strip can also be provided with good forming properties in the as delivered condition and/or high strength post brazing depending on the core material chemistry/manufacturing process used.

The production of the strip is made in several stages. According to one embodiment, the strip is produced by firstly casting slabs of cladding, interlayer and core materials. The outermost cladding slab material is then scalped and preheated according to standard industrial practices and procedures before breakdown rolling to a suitable plate thickness, where it is cut to length. The interlayer material is scalped and preheated to a temperature of no more than 520° C. and no less than 380° C. and soaked for 1-24 hours at temperature before breakdown rolling to a suitable plate thickness, where it is also cut to length. Then, the interlayer plate is attached to the core on one or both sides using a suitable attachment method, e.g. welding along the long side of the core/interlayer interface. Subsequent to that a second plate, e g a braze plate, is attached to the interlayer plate using e.g. welding along the long side of the braze/interlayer interface. Optionally, the interlayer plate is attached without a second plate being attached to it. Optionally, the second plate may be attached to one side without an interlayer between the second plate and the core.

To even further improve the resistance to braze metal penetration the core may be unhomogenised or homogenised at a temperature of equal to or less than 520° C., preferably less than 490° C., more preferably less than 460° C.

When a high formability is desired the core may be homogenised at a temperature of more than 520° C., more preferably more than 550° C., most preferably more than 580° C., even more preferably more than 600° C.

The high resistance to liquid core penetration during brazing is partly a result of the interlayer having a very large grain size after the recrystallisation that occurs during brazing. This is obtained by the combination of the chemical composition and heat treatments of the interlayer and the degree of cold deformation without recrystallisation of the interlayer when manufacturing the strip. According to one embodiment of the invention, the average grain size of the interlayer after brazing is at least 100 μm, preferably at least 150 μm, more preferably at least 250 μm, even more preferably at least 300 μm, most preferably at least 400 μm. The production steps of casting and heat treatments before hot rolling are controlled to achieve a large and repeatable Zener drag. The result is that when the braze clad melts during brazing, the grain size of the interlayer will be very large and only a few grain boundaries be present.

Moreover, the high resistance to liquid core penetration during brazing is also a result of the fact that the grain boundaries also are of a certain type that is not sensitive to liquid core penetration. Such grain boundaries can be created in materials with a very strong texture where only a certain type of crystal orientation exist. The volume percentage of the interlayer material exhibiting a texture component is at least 30%, more preferably ≥50% even more preferably ≥70%, most preferably ≥85%. The P-texture defined as {110}<111> is a preferred example of such a texture. It has been found that the liquid core penetration decreases with a stronger P-texture in the intermediate layer. The P-texture has two symmetrical variants. Grains within each variant have only grain boundaries of low angle character and these are resistant to melt penetration. Misorientations between the two ideal P-orientations has a twin character also less sensitive than other high angle boundaries for melt penetration. The higher the volume fraction P-texture, the better resistance to liquid grain boundary penetration. Other types of textures falling within the invention includes the cube {001}<100>, rotated cube {001}<110> or {001}<310> and the goss texture {011}<100>. Thus, the texture of the interlayer results in a very low susceptibility of the strip to liquid core penetration during the remaining part of the brazing operation.

A high degree of deformation increases the driving force while a high number of small particles retard the driving pressure for recrystallisation. The driving force increases with increased rolling reduction, especially cold reduction, but will be decreased by recovery during the temper annealing. It is very important to control the driving force and the retarding pressure quantitatively to achieve the good material properties of the interlayer at the different stages of the manufacturing process. Therefore, the number of small dispersoid particles should preferably be controlled by preheating of the package consisting of core slab, interlayer claddings and optional braze claddings to less than 550° C., preferably between 380-520° C., more preferably 450-520° C., most preferably 470-520° C. prior to hot rolling, in combination with mainly the chemical composition. Alternatively the interlayer slab may have been heat treated at these temperatures prior to attachment to the core slab. The soaking time at temperature when reaching the target temperature is 1-24 hours. The number density of particles is proportional to the retarding pressure hindering recrystallisation.

The interlayer is from its as cast or as hot rolled condition reduced in height by rolling at least 90%, preferably at least 95%, more preferably at least 97.5%, most preferably at least 99% after the last heat treatment causing recrystallisation of the interlayer in case such a recrystallisation has occurred. The cold rolled strip is thereafter heat treated to the delivery temper with the purpose to soften the material by a tempering without any recrystallisation of the interlayer alloy. It is important that the degree of induced deformation is not reduced below the above mentioned limits by heat treatments that recrystallises the interlayer. The core may however be recrystallised or not be recrystallised in the as delivered condition.

The high resistance to liquid core penetration is also a result of the diffusion of silicon from the braze clad (or any other type of aluminium-silicon clad) into the interlayer during brazing or final temper annealing. Naturally, the braze clad may be one which is applied to the strip itself or to a component to which the strip should be brazed depending on the intended application of the strip. The silicon diffusion into the interlayer will combine with manganese in surplus and form a very high number density of fine Mn-rich particles necessary for control of the grain structure development. Thus, the composition of the interlayer is also important to ensure that such particles are able to be formed during brazing.

The corrosion resistant strip according to the present invention comprises a core and an interlayer, wherein the core after brazing is more noble than the interlayer. This means that the interlayer is electrochemically sacrificial compared to the core and that a corrosion potential is present between the core and the interlayer. The resistance of the strip to pitting corrosion and perforation corrosion becomes very high. This is achieved by selecting the appropriate chemical composition and processing of the respective layers of the strip.

As mentioned above, the strip according to the present invention comprises a core and an interlayer. A braze clad or another type of aluminium alloy based clad may suitably be applied on top of the interlayer such that the interlayer is sandwiched between the core and the clad. Alternatively, a braze clad may be present on the component onto which the strip is to be brazed such that after brazing, the interlayer being located between the core and the brazing clad after joining.

The strip may also comprise additional layers if desired without departing from the scope of the invention. For example, interlayers may be present on both sides of the core, or some type of other layer may be present on the side of the core opposite the side on which the interlayer is present. Examples of such other types of layers are e.g. waterside claddings that reduce the propensity for pitting corrosion from the waterside in heaters or radiators in automotive applications. One may also envision that the side not clad with the interlayer faces a non-corrosive environment and that the extreme corrosion resistance is not needed on that side of the sheet and therefore one may attach a braze cladding or a braze laminate such as layers used in fluxless brazing in CAB.

In accordance with a preferred embodiment of the present invention, the interlayer is immediately adjacent the core layer, i.e. there is no other layer present between the core and the interlayer.

The effect of interlayer chemistry will now be described in more detail below. The composition of the interlayer and the effect of the different alloying elements are described in more detail.

Mn in dispersoid particles and in solid solution increases the post braze strength. Furthermore, Mn is used to create a controlled, repeatable and large number of particles which is necessary for grain structure control to reduce the sensitivity to liquid core penetration. The content of the interlayer provided according to the present invention is at least 0.5 and at most 1.8% supports inter alia the strength of the strip according to the present invention. Optimized properties may be reliably achieved if the Mn content is at least 0.7% and at most 1.7%, more preferably if the Mn content is 0.9-1.6%.

Fe has an adverse effect mainly as it increases the risk for formation of large intermetallic constituent particles formed during solidification and its content should not be more than 0.7% to avoid limiting the amount and use of Mn in the material. Preferably, Fe is limited to ≤0.5%, more preferably ≤0.3%.

Si decreases the solubility of Mn and creates a high density of dispersoid particles combined with Mn. Some Si may also be in solid solution. Both in solid solution and in dispersoid particles, Si adds to the strength. Too high level of Si increases the risk for liquid core penetration during brazing. The Si content of the interlayer should be ≤0.9%, suitably ≤0.7%, preferably 0.1-0.55%, more preferably 0.15-0.40%.

The strength may be further improved by the addition of group IVb, Vb, or VIb elements, or combinations of these elements, to the interlayer of the present invention, as some of these elements will add to the number density of fine dispersoid particles. If added, the individual content of these elements should be ≤0.3%, and the sum of these elements ≤0.5% to avoid formation of coarse constituent particles formed during solidification. Such particles have a negative influence on the formability and strength of the strip produced according to the present invention. The content of the group IVb, Vb, or VIb elements should preferably be in the range 0.05-0.2%. According to one embodiment Zr, Ti and/or Cr are used as the dispersoid forming element from these groups, preferably in the range 0.05-0.2%, more preferably 0.1-0.2%. Furthermore, in combination with Mn and Fe, Cr and/or Ti may lead to very coarse constituent particles. Therefore, in the alloy used according to the present invention, if Cr or Ti is added the Mn content should be in the lower region of the above defined range.

The content of Cu is limited to at most 0.5%, preferably ≤0.2%, more preferably ≤0.1%, most preferably ≤0.05% in the interlayer of the present invention. Cu increases the strength, but also leads to a more positive corrosion potential, i.e. a more "noble" material. Therefore, depending on the composition of the core, the Cu content of the interlayer should be kept sufficiently low to ensure that the desired corrosion potential difference between the core and the interlayer is achieved such that the interlayer provides the desired corrosion protection.

Small amounts of Mg may be added to the interlayer according to the present invention as a strength increasing element. However, since Mg has a very strong negative influence on the brazability in CAB, the content of magnesium is restricted to ≤0.7%, preferably ≤0.3%, more preferably ≤0.15%, most preferably ≤0.05%. It furthermore increases the risk for incipient melting of the material at the brazing temperature. However, in vacuum brazing Mg is necessary to form joints successfully and for vacuum brazing purposes Mg levels of up to 0.7% are therefore permissible in accordance with one embodiment of the invention.

Zn may be added to decrease the corrosion potential of the interlayer material and thereby provide the core material with a cathodic protection. The Zn content used is normally restricted to 4.0% and is preferably ≤1.0%, more preferably ≤0.5%, most preferably ≤0.1%. However, in all instances it is necessary that the corrosion potential difference between the core and the interlayer is matched such that the interlayer is suitably less electrochemically noble than the core after brazing.

The interlayer may also comprise ≤1.5% Ni without deteriorating the properties of the interlayer. However, in accordance with one embodiment, the Ni content is ≤1.0%, preferably ≤0.5%. According to one embodiment, the interlayer is essentially free from Ni.

The amount of Sn in the interlayer should preferably be kept below 0.009% to avoid problems at rolling.

The thickness of each attached interlayer according to the present invention is preferably in the interval of 2-20% of the total strip thickness.

The effect of the core chemistry will now be discussed. The composition of the core is selected such that the core is more noble than the interlayer, at least post brazing.

Preferably, the core of the strip according to the present invention has a composition essentially consisting of in percentages by weight:
Si≤1.0%, preferably ≤0.5%, more preferably ≤0.3%, most preferably ≤0.15%
Fe≤0.7%, preferably ≤0.5%, more preferably ≤0.3%
Cu≤1.0%, preferably 0.1-1.0%, more preferably 0.3-0.9%, most preferably 0.3-0.7%
Mn 0.5-1.8%, preferably 0.7-1.7%, more preferably 0.9-1.6%
Mg≤0.7%, preferably ≤0.5%, more preferably ≤0.3%
Zn≤0.5%, preferably ≤0.3%, more preferably ≤0.1%, most preferably ≤0.05%
Ni≤1.5% preferably ≤1.0%, more preferably ≤0.5%
elements selected from group IVb, Vb, and/or VIb of the periodic table ≤0.3% each and ≤0.5% in total
≤0.05 wt % each and ≤0.15% in total, of unavoidable impurity elements, balance Al.

As previously discussed, the composition of the core is suitably selected within the ranges of the composition given above such that the core is more noble than the interlayer post brazing and thus depends on the exact composition of the interlayer for each possible combination. It is however within the common knowledge of the skilled person how the compositions of the different layers could be selected to achieve the difference in corrosion potential of the core and the interlayer. Naturally, the brazing process will influence the difference in corrosion potential between the core and the interlayer due to the diffusion of silicon into the interlayer. The chemical composition of the interlayer and core will be affected by interdiffusion during brazing. Both core and interlayer will also exhibit a gradient of various chemical elements throughout the thickness of e.g. the interlayer. However, by careful control it is ensured that the core is more noble than the interlayer also after brazing.

The effect of the clad layer thickness and clad composition is further discussed below for embodiments where an Al—Si based clad is present.

For brazing of the strip produced according to the present invention the braze cladding layer thicknesses is preferably 2% to 20% of the total thickness of the strip on one or both sides of the core/interlayer package. The alloys concerned may, for example, be typical brazing alloys based on Al—Si (Si 4-13%), such as AA4343, AA4045 or AA4047, as well as typical protective claddings based on commercially pure Al alloys (AA1XXX, Si 0-0.5%) and the modifications of these alloys (Si 0.5-4% or Si 0.6-3%), such as Al alloys having a Si content of about 1%, 2%, or 3% Si. One may also optionally add Zn in amounts up to 4%, including additions of 0.5%, 1%, 2% and 3%, to modify the surface corrosion potential even further after brazing, and optionally up to 0.2% Bi to make wetting easier. For vacuum brazing the cladding may contain at least 0.5% up to 1% or up to 1.5% or 2.0% or up to 2.5% Mg for oxide disruption purposes. The cladding is preferably applied using roll bonding.

EXAMPLES

Experimental Details

All materials were lab scale cast and scalped and the core material was heat treated for ~2 hours at 500° C. followed by slow cooling before rolling to a suitable thickness. All materials according to the invention were lab scale cast and scalped and preheated for ~2 hours at 500° C. followed by slow cooling before rolling to a suitable thickness. The braze cladding, inter-layer and core alloy were back annealed to make it easier to metallurgically combine the core, interlayer and braze using laboratory cold rolling until the correct thickness was reached. The back anneal is optional when full scale rolling.

The material stack having a total thickness of 0.3 mm was temper annealed at a suitable temperature in the interval 250-300° C. to obtain an H24 temper. The heating rate used was 50° C./h up to the soak temperature. A dwell time of 2 hours at temperature was used followed by cooling with 50° C./h to room temperature. The total reduction rate without any recrystallisation of the interlayer taking place was more than 99% for all samples.

CAB braze simulation was made in inert atmosphere without flux by heating from room temperature to 600° C. in 23 minutes, 3 minutes dwell and forced furnace cooling to ~440° C. followed by free cooling in air.

The chemical compositions, in wt-% measured using Optical Emission Spectrometry (OES), of the materials are shown in Table 1. The material combinations and the thickness of as produced materials measured by optical microscopy are given in Table 2. For structure studies the materials were mounted, ground, polished, etched and anodised following standard laboratory procedures before examination in light optical microscopy (LOM), or scanning electron microscopy (SEM) equipped with back scatter electron detection (EBSD) for texture examination Tensile testing was made in the longitudinal direction before and after brazing.

SWAAT corrosion testing was performed according to ASTM G85-02, Annex A3, without heavy metals. The synthetic ocean sea water solution was made up in accordance with ASTM D1141, but for the pH adjustment, which was done after the acetic acid addition; a solution of 1 M NaOH was used to achieve a pH of 2.9. Samples were withdrawn from the testing chamber, cleaned and checked for corrosion perforation using a light board. The time to perforation (TTP) was noted.

TABLE 1

Chemical composition in wt-% (OES analysis).

| Alloy | | Si | Fe | Cu | Mn | Mg | Zn | Zr | Ti |
|---|---|---|---|---|---|---|---|---|---|
| A (AA4343) | Braze | 7.7 | 0.20 | <0.01 | <0.01 | <0.01 | 0.01 | <0.01 | <0.01 |
| B (AA4045) | Braze | 9.8 | 0.16 | <0.01 | <0.01 | <0.01 | <0.01 | <0.01 | <0.01 |
| C | Braze | 5.4 | 0.20 | <0.01 | <0.01 | <0.01 | 0.01 | <0.01 | <0.01 |
| D | Inter-layer | 0.53 | 0.24 | <0.01 | 1.7 | <0.01 | 0.02 | 0.11 | 0.02 |
| E | Inter-layer | 0.86 | 0.24 | 0.01 | 1.6 | 0.01 | 0.03 | 0.12 | 0.02 |
| F | Inter-layer | 0.08 | 0.16 | <0.01 | 1.0 | <0.01 | 0.01 | <0.01 | 0.21 |
| G (AA3003) | | 0.13 | 0.50 | 0.11 | 1.1 | 0.01 | 0.03 | <0.01 | 0.02 |
| H | Core | 0.06 | 0.25 | 0.5 | 1.5 | 0.18 | <0.01 | <0.01 | 0.16 |
| I | Core | 0.05 | 0.19 | 0.80 | 1.7 | <0.01 | <0.01 | 0.12 | 0.04 |
| J | Core | 0.48 | 0.21 | 0.44 | 1.1 | <0.01 | <0.01 | <0.01 | 0.04 |
| K | Core | 0.07 | 0.22 | 0.32 | 1.2 | 0.23 | 0.02 | <0.01 | <0.01 |
| M | Core | 0.58 | 0.25 | 0.62 | 1.4 | 0.03 | <0.01 | <0.01 | 0.14 |
| N | Core | 0.05 | 0.19 | 0.80 | 1.7 | <0.01 | <0.01 | 0.12 | 0.04 |
| O | Core | 0.06 | 0.23 | 0.65 | 1.7 | 0.04 | <0.01 | 0.12 | 0.04 |
| P | Core | 0.08 | 0.26 | 0.36 | 1.5 | <0.01 | <0.01 | <0.01 | 0.16 |

TABLE 2

Alloy combinations and SWAAT performance expressed as time to perforation (TTP).

| ID | Comment | Braze | Interlayer | Interlayer thickness [μm] | Core | Gauge [mm] | TTP (days) | SWAAT sample retrieval (days) |
|---|---|---|---|---|---|---|---|---|
| 1a | Inventive | A | D | 11 | H | 0.15 | 45-60 | 10, 21, |
| 1b | Inventive | A | D | 13 | H | 0.2 | 74+ | 32, 45, |
| 1c | Inventive | A | D | 19 | H | 0.25 | 74+ | 60, 74 |
| 2a | Inventive | B | D | 10 | H | 0.15 | 60+ | |
| 2b | Inventive | B | D | 12 | H | 0.2 | 60+ | |
| 2c | Inventive | B | D | 18 | H | 0.25 | 60+ | |
| 3a | Inventive | C | D | 10 | H | 0.15 | 45-60 | |
| 3b | Inventive | C | D | 11 | H | 0.2 | 60+ | |
| 3c | Inventive | C | D | 17 | H | 0.25 | 74+ | |
| 4 | Inventive | A | G | 20 | H | 0.2 | 60+ | |
| 5 | Inventive | A | E | 19 | H | 0.2 | 60+ | |
| 6 | Inventive | A | D | 20 | K | 0.2 | 60+ | |
| 7 | Inventive | A | D | 20 | I | 0.2 | 74+ | |
| 8 | Inventive | A | F | 21 | H | 0.2 | 74+ | |
| 9 | Comparative | A | D | 21 | G | 0.2 | <10 | |
| 10 | Inventive | A | D | 23 | J | 0.2 | 74+ | |
| 11 | Inventive | A | D | 18 | M | 0.2 | 74+ | |
| 12 | Comparative | A | — | — | H | 0.2 | <10 | |
| 13 | Comparative | A | — | — | M | 0.2 | 21-35 | |
| 14 | Inventive | A | D | 20 | N | 0.2 | 49+ | 10, 28, |
| 15 | Comparative | A | — | | N | 0.2 | 10-28 | 45, 49 |

TABLE 2-continued

Alloy combinations and SWAAT performance expressed as time to perforation (TTP).

| ID | Comment | Braze | Interlayer | Interlayer thickness [μm] | Core | Gauge [mm] | TTP (days) | SWAAT sample retrieval (days) |
|---|---|---|---|---|---|---|---|---|
| 16 | Inventive | A | D | 20 | O | 0.2 | 49+ | |
| 17 | Comparative | A | — | | O | 0.2 | 10-28 | |
| 18 | Inventive | A | D | 15 | P | 0.2 | 49+ | |
| 19 | Inventive | A | D | 30 | P | 0.2 | 49+ | |

Example 1

The Influence of Interlayer on Corrosion Performance

The results from SWAAT-testing are presented in Table 2 above. All materials with a more noble core than interlayer show excellent corrosion performance. One interlayer and core combination, i.e. material number 9, does not have a core which after brazing is more noble than the interlayer and the corrosion performance is very poor.

Materials with interlayers produced according to the present invention are compared to materials of same core material but without interlayer.

The corrosion performance of the materials with an interlayer according to the present invention is significantly improved compared to materials without interlayer. In Table 3 below is an excerpt from Table 2 to illustrate this.

TABLE 3

SWAAT performance of alloy combinations. Time To Perforation (TTP).

| | | | Interlayer | | | TTP SWAAT |
|---|---|---|---|---|---|---|
| ID | Comment | Braze | Designation | Thickness | Core | (days) |
| 1c | Inventive | A | D | 19 um | H | 74+ |
| 12 | Comparative | A | — | | H | <10 |
| 10 | Inventive | A | D | 18 um | M | 74+ |
| 13 | Comparative | A | — | | M | 21-35 |
| 14 | Inventive | A | D | 20 um | N | 49+ |
| 15 | Comparative | A | — | | N | 10-28 |
| 16 | Inventive | A | D | 20 um | O | 49+ |
| 17 | Comparative | A | — | | O | 10-28 |

Example 2

The Influence of Interlayer Thickness

The thickness of the interlayer is one parameter that needs to be controlled in order to provide the desired result. A too thin interlayer cladding will naturally not supply sufficiently good properties after brazing. A too thick interlayer cladding will act essentially as a core without any interlayer and the likelihood for pitting corrosion will increase drastically, and may even reduce the corrosion resistance of the brazed product. In other words, if the interlayer is too thick, the advantages obtainable by the difference in corrosion potential between the core and the interlayer will have less effect on the strip.

It is important not only to examine the time to perforation but also the propensity by which perforation takes place, e.g. the number of perforations on a given sample size and the general corrosion morphology. Typically, a lateral corrosion morphology with general surface attack is beneficial whereas pitting and intergranular corrosion may exert a negative influence on the lifetime of the brazed product.

Figure 1:
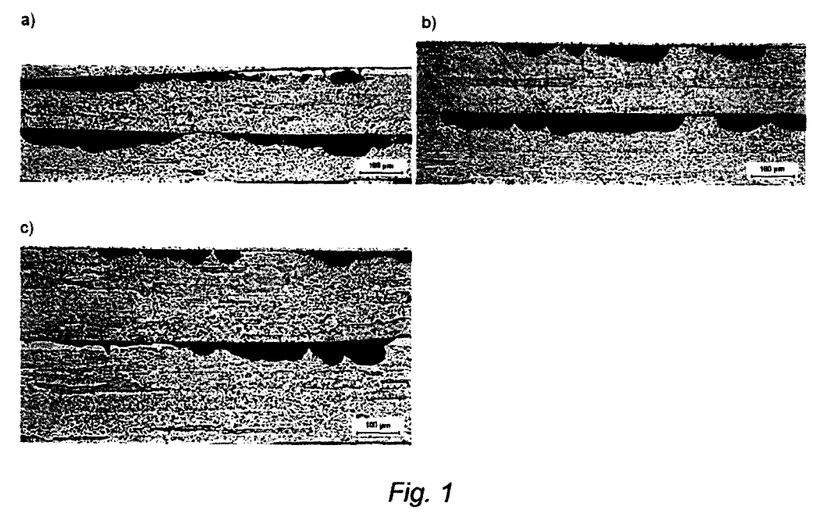
FIG. 1 shows sections of laminated coupons of material according to the invention after 45 days SWAAT, a) Sample 3a 0.15 mm, b) Sample 3b 0.20 mm, c) Sample 3c 0.25 mm.
Figure 2:
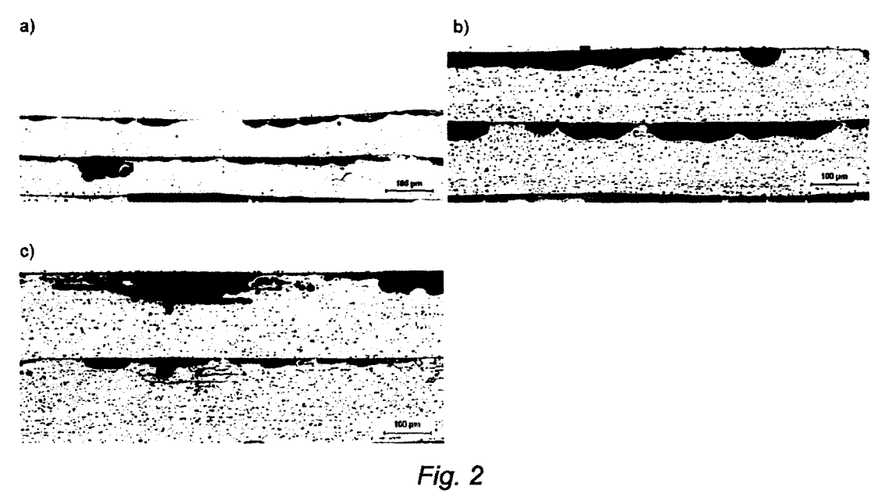
FIG. 2 shows Sections of laminated coupons of material according to the invention after 60 days SWAAT, a) Sample 3a 0.15 mm, b) Sample 3b 0.20 mm, c) Sample 3c 0.25 mm.
Figure 3:
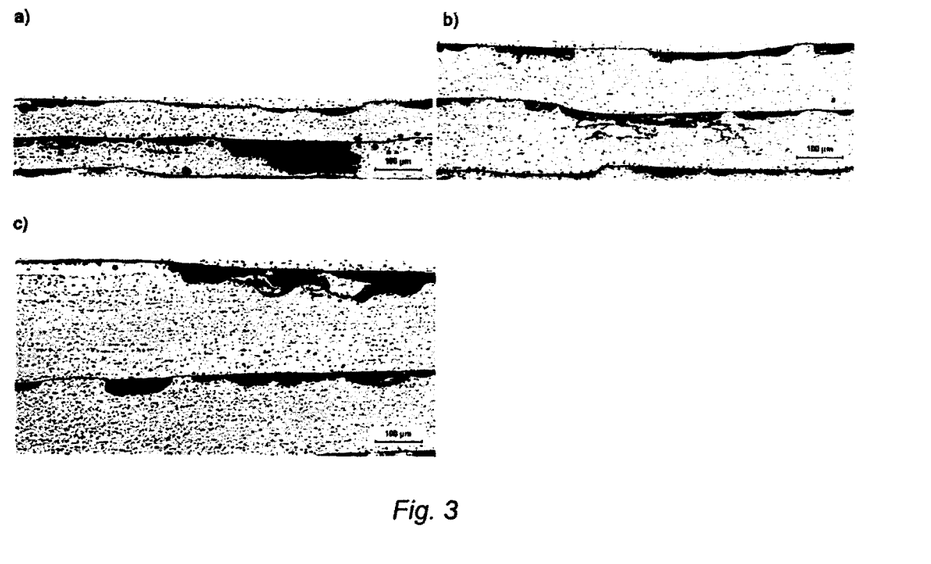
FIG. 3 shows sections of laminated coupons of material according to the invention after 74 days SWAAT, a) Sample 3a 0.15 mm, b) Sample 3b 0.20 mm, c) Sample 3c 0.25 mm.

In Table 4 below the corrosion assessment of a laminated material with three different thicknesses can be reviewed. The assessment was made after 45, 60 and 74 days of SWAAT testing of a sample coupon of area 60*110 mm$^2$. Sections of these coupons after SWAAT are seen in FIGS. 1, 2 and 3 for sample material 3a, 3b and 3c, where 3c has the thickest and 3a the thinnest interlayer. It is apparent that a thicker interlayer is providing a better resistance to detrimental corrosion and a more beneficial corrosion mode than a thinner one. However, even the thinnest interlayer disclosed here provide a significant improvement compared to the equivalent materials without interlayers, see Example 1.

TABLE 4

The SWAAT performance and corrosion assessment of sample 3 with a variety of interlayer thicknesses.

| SWAAT | Sample | Attack through material | IGC | Comments |
|---|---|---|---|---|
| 45 days | 3a | No | No | Lateral superficial corrosion |
| | 3b | No | No | |
| | 3c | No | No | |
| 60 days | 3a | Yes, >20 locations | Moderate | Lateral corrosion with local perforations |
| | 3b | No | Minor | Lateral corrosion with some deeper |
| | 3c | No | Minor | attack, but typically 50-70% of core thickness left |
| 74 days | 3a | Yes, >20 locations | Moderate | Lateral corrosion with some deeper pits |
| | 3b | Yes, 10-15 locations | Moderate | Lateral corrosion with deep local perforation pits |

TABLE 4-continued

The SWAAT performance and corrosion assessment of sample 3 with a variety of interlayer thicknesses.

| SWAAT | Sample | Attack through material | IGC | Comments |
|---|---|---|---|---|
|  | 3c | No | Minor | Lateral corrosion with some deeper pits without perforation, typically at least 50% of strip thickness remains there |

Mechanical Properties

Mechanical properties of the lab rolled materials are given in Table 5.

TABLE 5

Mechanical properties for selected pre- and post brazed lab rolled materials.

|  | Pre brazed | | | Post brazed | | |
|---|---|---|---|---|---|---|
|  | $R_{p0.2}$ (MPa) | $R_m$ (MPa) | $A_{50\,mm}$ (%) | $R_{p0.2}$ (MPa) | $R_m$ (MPa) | $A_{50\,mm}$ (%) |
| 1a | 230 | 256 | 7.8 | 63 | 172 | 12.6 |
| 1b | 226 | 254 | 8.0 | 63 | 172 | 14.0 |
| 1c | 222 | 249 | 8.7 | 65 | 174 | 13.6 |
| 2a | 230 | 254 | 8.2 | 65 | 177 | 13.2 |
| 2b | 230 | 255 | 7.0 | 66 | 176 | 13.7 |
| 2c | 234 | 257 | 7.1 | 65 | 175 | 15 |
| 3a | 220 | 246 | 9.3 | 61 | 165 | 13.2 |
| 3b | 222 | 248 | 8.4 | 62 | 170 | 15.4 |
| 3c | 220 | 248 | 7.6 | 62 | 170 | 17.6 |
| 4 | 250 | 278 | 5.0 | 64 | 172 | 14.8 |
| 5 | 247 | 270 | 3.8 | 65 | 174 | 13.4 |
| 6 | 194 | 224 | 9.0 | 56 | 154 | 13.6 |
| 7 | 216 | 232 | 6.3 | 59 | 166 | 14.2 |
| 8 | 218 | 240 | 10.7 | 63 | 174 | 14.8 |
| 9 | 154 | 163 | 14.5 | 49 | 134 | 11.9 |
| 10 | 190 | 210 | 4.2 | 60 | 160 | 13.2 |
| 11 | 195 | 218 | 10.2 | 63 | 176 | 14.4 |
| 12 | 241 | 280 | 6.9 | 72 | 191 | 15.6 |
| 13 | 188 | 214 | 8.4 | 60 | 174 | 13.2 |

* The fracture occurred outside or near to the end of the extensometer gauge length.

Example 3

A brazing sheet with the material combination according to alloy combination 7 in Table 2 was prepared according to the experimental details described above. After brazing the material was mounted in the longitudinal direction, ground and very finely polished and elecropolished to facilitate good surfaces for EBSD measurement. The recrystallization texture of the interlayer was measured with EBSD. All in all 150 mm of interlayer length was examined in order to ensure good statistics for the texture analysis.

Figure 4:
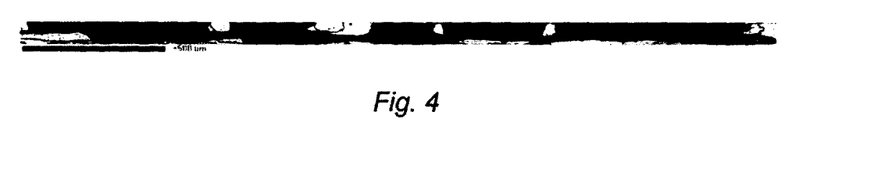
FIG. 4 shows an interlayer according to the invention depicted with the grains obeying the {110}<111> texture filled in with black colour, and the grains with all other texture components filled in with light gray. The height scale of the image is different than the width scale for reason of visual clarity. The height is about 20 μm.
Figure 5:
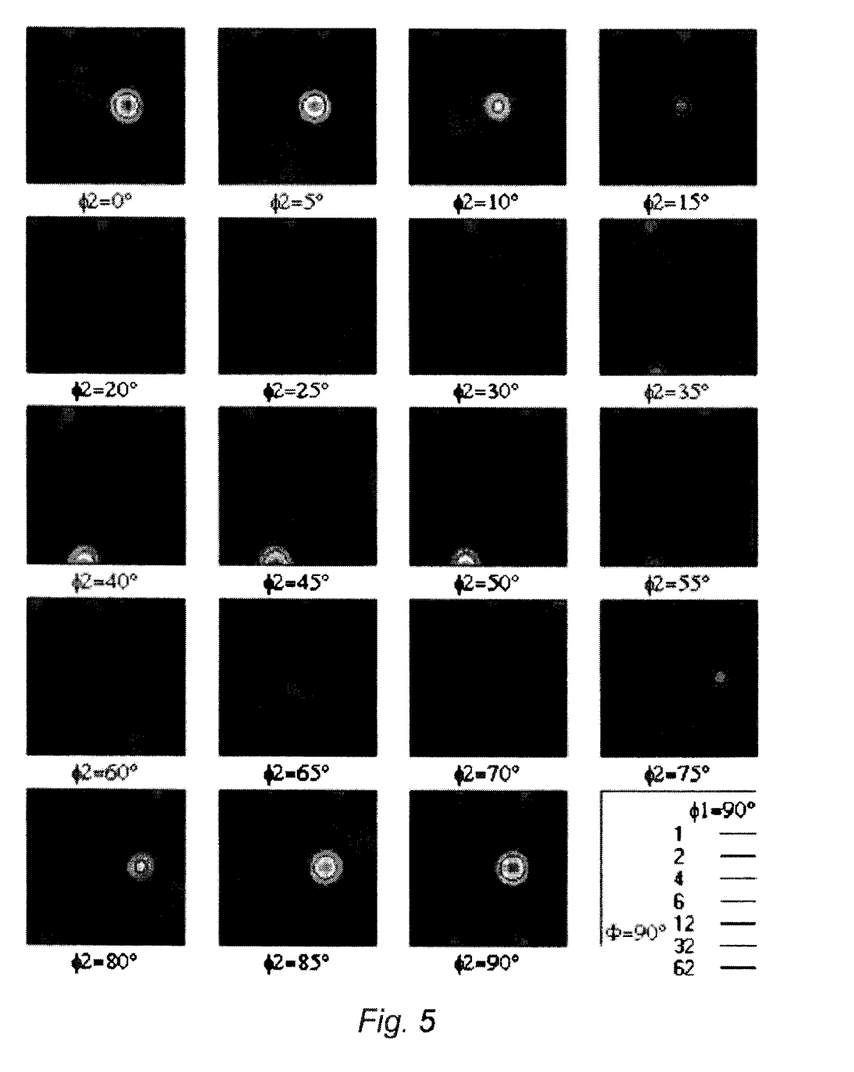
FIG. 5 shows an ODF (Orientation Distribution Function) of the interlayer according to the invention.

The interlayer withstood the molten filler penetration excellently with little dissolution, and the grains in the interlayer were large. It was found that a {110}<111> texture dominated the interlayer and a volume fraction of 61% was obtained. The mean grain size of the material with this texture was 302 μm. In FIG. 4 the interlayer is depicted with the grains with the {110}<111> texture filled in with black colour, and the grains with all other texture components filled in with a light gray. In FIG. 5 an ODF (Orientation Distribution Function) of this material is shown.

Comparative Example 1

Figure 6:
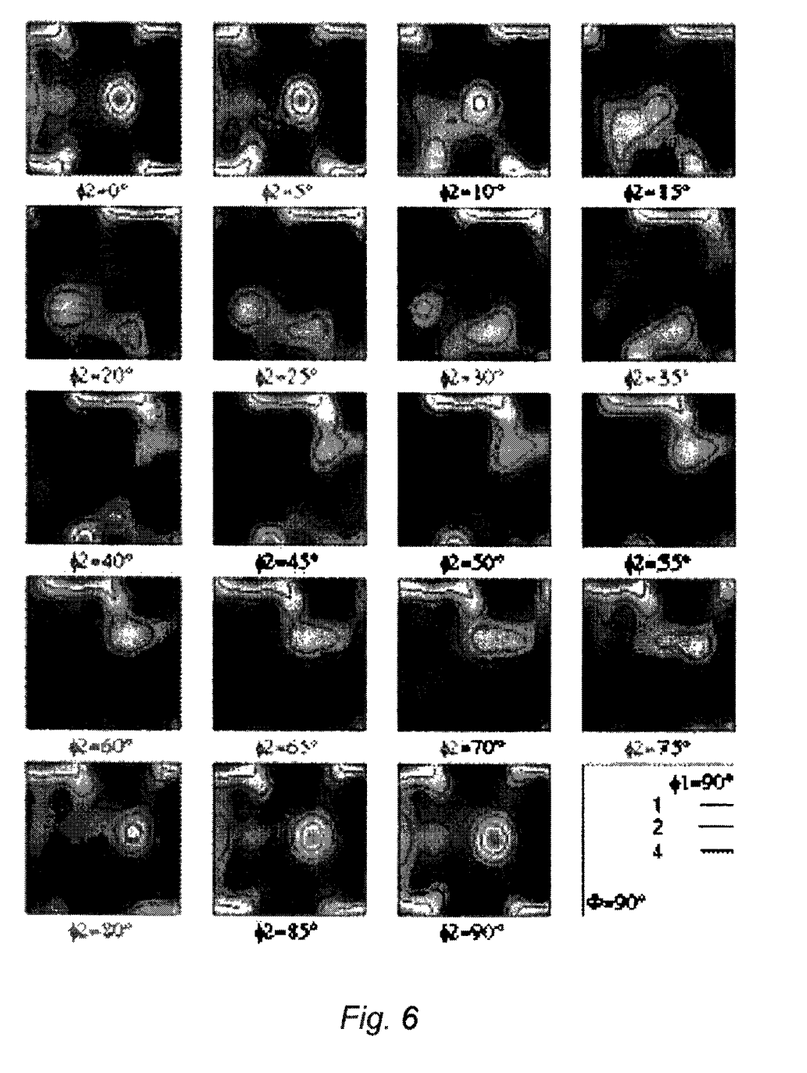
FIG. 6 shows an ODF of the interlayer made from a comparative material.

This sheet combination was a braze alloy according to alloy A, an interlayer according to alloy G and a core according to alloy I. The interlayer was first homogenised at 600° C. for 10 hours before assembling of the layers, preheating and co-rolling to give a clad sheet. After brazing the material was processed and analyzed in the same way as in Example 3. The interlayer withstood the molten filler poorly with significant dissolution, and the grains in the interlayer were smaller than 100 μm. It was found that the texture was very weak and a volume fraction of about 5% or less was obtained for the {110}<111> texture component. FIG. 6 shows an ODF for the comparative interlayer material.

Comparative Example 2

Figure 7:
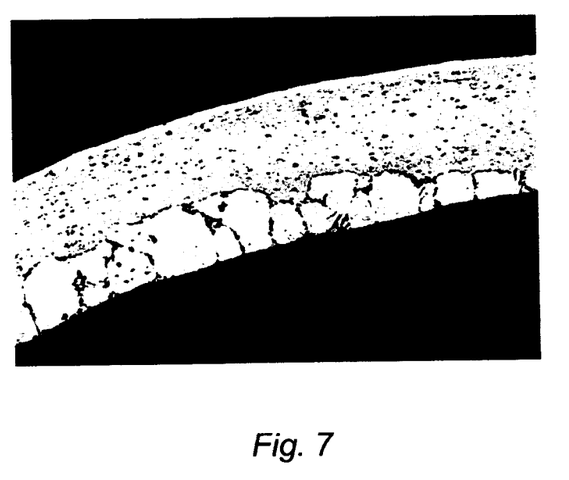
FIG. 7 shows the post-brazed particle microstructure image depicting a comparative material that has been soft annealed and stretched 4% before brazing. The side with the interlayer shows significant liquid film migration.

A material combination of a braze according to alloy A and an interlayer according to alloy E on one side of a core according to alloy I and the other side of the core being clad with a braze according to alloy A. The individual materials were heated and rolled as in comparative example 1, but with a final soft annealing at 380° C. to recrystallise the interlayer as well as the core and braze. The material was then subjected to a slight deformation of 2-10% to simulate an industrial forming operation. Finally, the material was subjected to a brazing process as indicated above. After brazing the material exhibited significant interaction between interlayer and molten braze metal, manifested as liquid film migration or dissolution of the interlayer material, see FIG. 7, thus substantially eliminating the function of the interlayer.

The corrosion resistant strip according to the present invention is intended for use in the manufacture of brazed products, especially brazed components for heat exchangers. It will be readily apparent to the skilled person that such components may be in any form, including but not limited to tubes, tanks, plates, or the like, without departing from the scope of the invention.

The invention claimed is:

1. A corrosion resistant strip comprising:
a core of an aluminium based alloy; and
an interlayer located between the core and an Al—Si based clad, wherein the interlayer has a composition consisting of in percentages by weight:
Si≤0.9%,
Fe≤0.7%,
Cu≤0.5%,
Mn 0.5-1.8%,
Mg≤0.7%,
Zn≤4.0%
Ni≤1.5%
elements selected from group IVb, Vb, and/or VIb of the periodic table ≤0.3% each and ≤0.5% in total,
≤0.05 wt % each and ≤0.15% in total, of unavoidable impurity elements, and
balance Al,
wherein a composition of the core and the composition of the interlayer are selected such that the core is more noble than the interlayer after brazing, and wherein the interlayer exhibits a volume fraction of a texture component of at least 30%.

2. A corrosion resistant strip according to claim 1, wherein the interlayer has a composition consisting of in percentages by weight:
Si≤0.7%,
Fe≤0.7%,
Cu≤0.5%,
Mn 0.5-1.8%,
Mg≤0.7%,
Zn≤4.0%
Ni≤1.5%
elements selected from group IVb, Vb, and/or VIb of the periodic table ≤0.3% each and ≤0.5% in total,
≤0.05 wt % each and ≤0.15% in total, of unavoidable impurity elements, and
balance Al.

3. A corrosion resistant strip according to claim 1 or 2, where the texture component is one of a P-texture {110}<111>, a cube {001}<100>, a rotated cube {001}<110> or {001}<310> and a Goss texture {011}<100> component.

4. A corrosion resistant strip according to claim 1, where the content of group IVb, Vb, and/or VIb of the periodic table of the interlayer is 0.05-0.2% Zr, Ti and/or Cr.

5. A corrosion resistant strip according to claim 1 or 2, the core having a composition consisting of in percentages by weight:
Si≤1.0%,
Fe≤0.7%,
Cu≤1.0%,
Mn 0.5-1.8%,
Mg≤0.7%,
Zn≤0.5%,
Ni≤1.5%
elements selected from group IVb, Vb, and/or VIb of the periodic table ≤0.3% each and ≤0.5% in total,
≤0.05 wt % each and ≤0.15% in total of unavoidable impurity elements, and
balance Al.

6. A corrosion resistant strip according claim 5, where the Si content of the core is ≤0.15%.

7. A corrosion resistant strip according to claim 1 or 2, comprising an Al—Si based clad, wherein said Al—Si based clad is an aluminium brazing material comprising 4-13% Si.

8. A corrosion resistant strip according to claim 1 or 2, wherein said Al—Si based clad is an aluminium alloy comprising 1-4% Si.

9. A corrosion resistant strip according to claim 1, where the thickness of each attached interlayer is in the interval of 2-20% of the total strip thickness.

10. A corrosion resistant strip according to claim 1, wherein the core is unhomogenised or is homogenised at a temperature of equal to or less than 520° C.

11. A corrosion resistant strip according to claim 1, wherein the core is homogenised at a temperature of more than 520° C.

12. A corrosion resistant strip according to claim 1, wherein the interlayer, in the as delivery condition, comprises Mn-rich particles in an amount of at least a dispersoid particle density in the range $1\times10^6$ to $20\times10^6$ particles/mm$^2$ of particles having a diameter in the range of 30-400 nm.

13. A corrosion resistant strip according to claim 1, wherein said strip has been heat treated to soften the material by a tempering without any recrystallisation of the interlayer at 200-500° C. for at least 10 minutes.

14. A corrosion resistant strip according to claim 1, wherein the average grain size of the interlayer after brazing is at least 100 µm.

15. A corrosion resistant strip according to claim 1 or 2, wherein the interlayer exhibits a volume fraction of a texture component of at least 50%.

16. A corrosion resistant strip according to claim 3, where the texture component is a P-texture {110}<111> component.

17. A corrosion resistant strip according to claim 1 or 2, where the interlayer contains <1% Zn.

18. A corrosion resistant strip according to claim 17, where the interlayer contains ≤0.5% Zn.

19. Brazed heat exchanger comprising a corrosion resistant strip according to claim 1.

20. A method of producing a corrosion resistant strip comprising a core and an interlayer, the interlayer adapted to be located between the core and an Al—Si based clad, the method comprising:
providing a core ingot of an aluminium based alloy;
attaching an interlayer to said core ingot, the interlayer having a composition consisting of in percentages by weight:
Si≤0.9,
Fe≤0.7%,
Cu≤0.5%,
Mn 0.5-1.8%,
Mg≤0.7%,
Zn≤4.0%
Ni≤1.5%
elements selected from group IVb, Vb, and/or VIb of the periodic table ≤0.3% each and ≤0.5% in total,
≤0.05 wt % each and ≤0.15% in total, of unavoidable impurity elements,
balance Al,
wherein the core is more noble than the interlayer post brazing;
optionally subjecting the core ingot with the attached interlayer to a preheating heat treatment;
hot rolling to obtain a strip having a core and an interlayer;
cold rolling the obtained strip such that the interlayer is reduced at least 90% in height after the last heat treatment causing recrystallisation of the interlayer; and
heat treating the cold rolled strip to the delivery temper with the purpose to soften the material by a tempering without any recrystallisation of the interlayer.

21. A method of producing a corrosion resistant strip according to claim 20, wherein the interlayer has a composition consisting of in percentages by weight:
Si≤0.7%,
Fe≤0.7%,
Cu≤0.5%,
Mn 0.5-1.8%,
Mg≤0.7%,
Zn≤4.0%
Ni≤1.5%
elements selected from group IVb, Vb, and/or VIb of the periodic table ≤0.3% each and ≤0.5% in total,
≤0.05 wt % each and ≤0.15% in total of unavoidable impurity elements, and
balance Al.

22. The method of producing a corrosion resistant strip according to claim 20, where cold rolling of the obtained strip results in the interlayer being reduced at least 99% in height.

23. The method according to claim 20, wherein the strip after the heat treatment to the delivery temper is subjected to a forming operation giving a level of cold work in a range of 0.05-20% cold work, where the core does not recrystallise during brazing, but the interlayer does recrystallize.

24. The method according to claim 20, where the content of group IVb, Vb, and/or VIb of the periodic table of the interlayer is 0.05-0.2% Zr, Ti and/or Cr.

25. The method according to claim 20 or 21, wherein core alloy has a composition consisting of in percentages by weight:
Si≤1.0%,
Fe≤0.7%,
Cu≤1.0%,
Mn 0.5-1.8%,
Mg≤0.7%,
Zn≤0.5%,
Ni≤1.5%,
elements selected from group IVb, Vb, and/or VIb of the periodic table ≤0.3% each and ≤0.5% in total,
≤0.05 wt % each and ≤0.15% in total, of unavoidable impurity elements, and
balance Al.

26. The method according to claim 25, where the Si content of the core is 0.15%.

27. The method according to claim 20, wherein the interlayer is provided as an interlayer ingot and attached to the core ingot, alternatively cast directly onto the core ingot.

28. The method according to claim 20, wherein the core ingot, alternatively the core ingot with the attached interlayer, is subjected to a homogenisation at a temperature of equal to or less than 520° C. prior to the hot rolling.

29. The method according to claim 20, wherein the core ingot is subjected to a homogenisation at a temperature higher than 520° C. prior to the hot rolling.

30. The method according to claim 20, wherein at least the interlayer is preheated to a temperature of up to 550° C. prior to hot rolling so as to form dispersoid particles in the interlayer.

31. The method according to claim 20, wherein at least the interlayer is preheated to a temperature 380-520° C. prior to hot rolling so as to form dispersoid particles in the interlayer.

32. The method according to claim 30, wherein the temperature and the time of said preheating is controlled such that a dispersoid particle density in the range $1 \times 10^6$ to $20 \times 10^6$ particles/mm$^2$ of particles having a diameter in the range of 30-400 nm is obtained.

33. The method according to claim 20, wherein the average grain size of the interlayer after brazing is controlled to be at least 100 μm.

34. Method for producing a brazed product, the method comprising using a corrosion resistant strip according to claim 1.

* * * * *